United States Patent Office 2,714,214
Patented Aug. 2, 1955

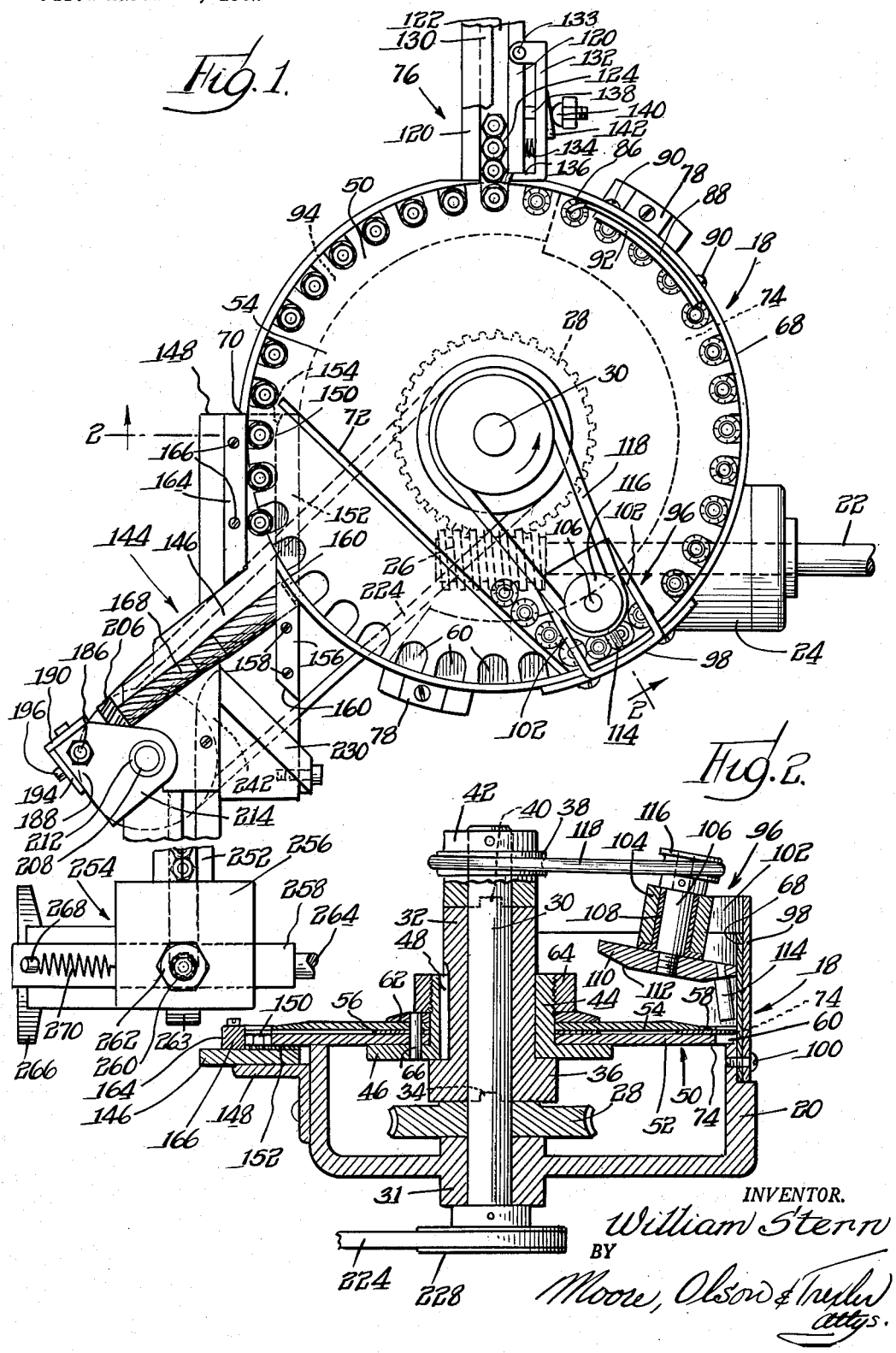

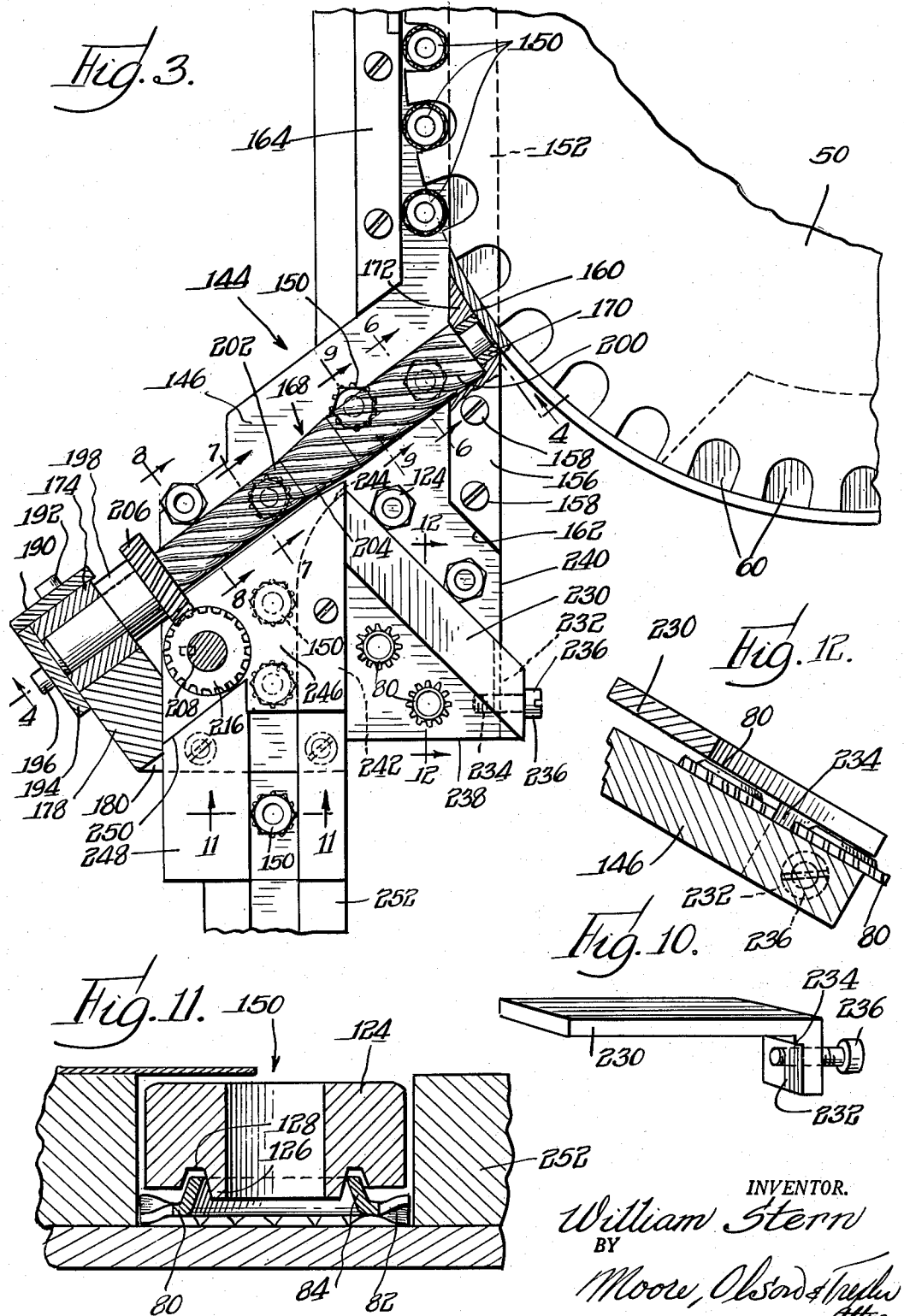

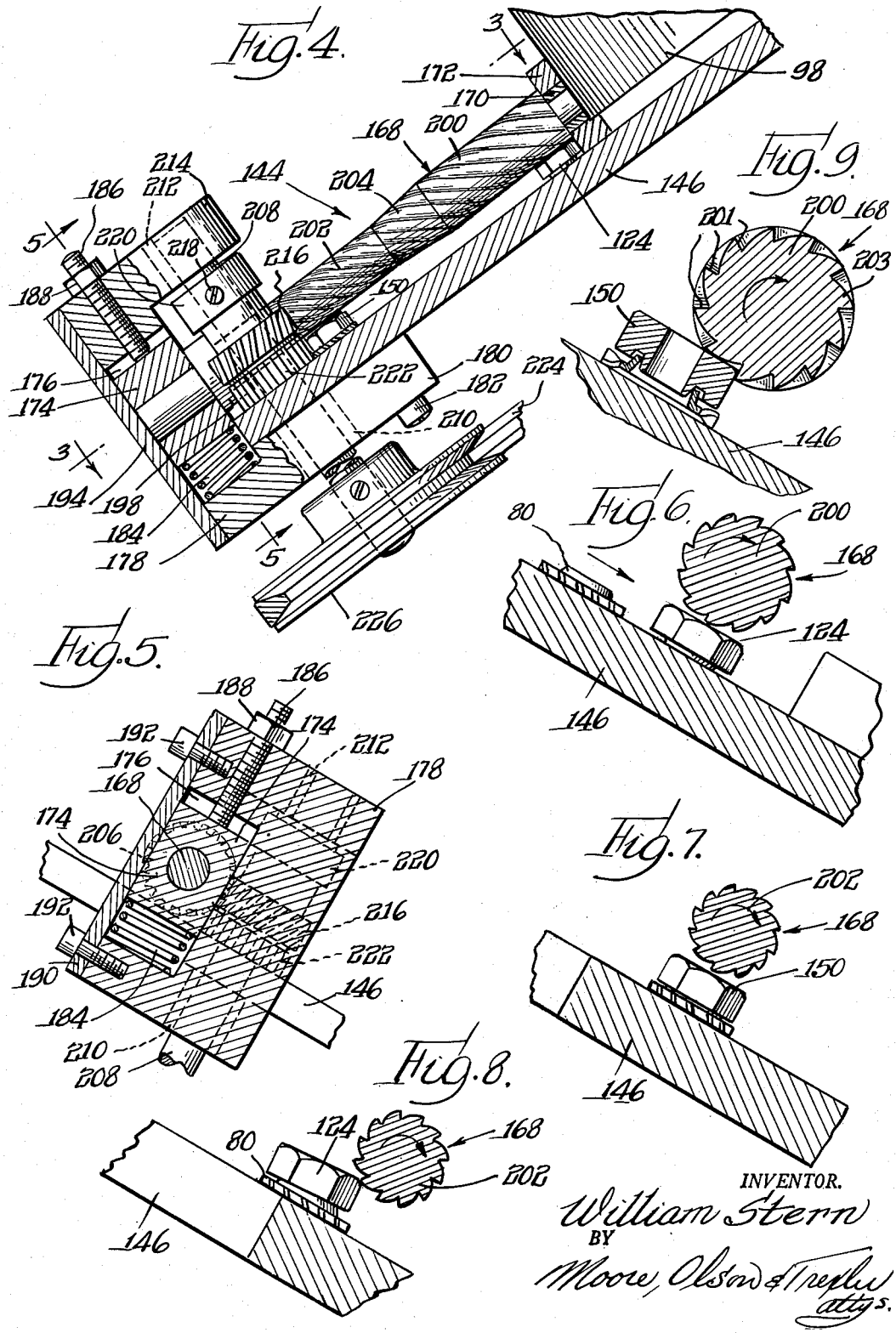

2,714,214

NUT AND WASHER ASSEMBLY SELECTOR

William Stern, Chicago, Ill., assignor to Illinois Tool Works, Chicago, Ill., a corporation of Illinois Application March 18, 1952, Serial No. 277,110

12 Claims. (Cl. 10—155)

This invention is concerned with a nut and washer assembly selector, particularly with an apparatus for separating properly assembled washers and nut elements from washers and nut elements that are not properly assembled.

In telescopically assembling fasteners and washers such as nut elements and lock washers, unassembled or improperly assembled nut elements and washers occasionally are discharged from the telescoping mechanism in spite of all possible precautions and in spite of the high degree of perfection of certain telescoping mechanisms. It is obviously undesirable to have improperly assembled or loose nuts and washers mixed in with perfect assemblies, both from a commercial standpoint and from the standpoint of avoiding jams or damage to further handling apparatus.

Accordingly, it is a primary object of this invention to separate perfect nut element and washer assemblies from defective assemblies.

More specifically, it is an object of this invention to separate properly telescoped nut elements and washers from loose nut elements and washers and from improperly telescoped nut elements and washers.

Another object of this invention is to segregate perfect nut element and washer assemblies, loose nut elements, loose washers, and improperly assembled nut elements and washers into individual groups.

A further object of this invention is to provide, in a machine for producing unit assemblies of nut elements and washers, mechanism for selecting perfect assemblies.

Other and further objects and advantages will be apparent from the following description when taken in connection with the accompanying drawings in which similar numerals are utilized to identify similar parts throughout, and wherein:

Fig. 1 is a fragmentary top view of an assembly machine embodying the principles of my invention;

Fig. 2 is a cross-sectional view taken substantially along the line 2—2 of Fig. 1;

Fig. 3 in a fragmentary top view of the machine showing the assembly selector on an enlarged scale and taken along the line 3—3 in Fig. 4;

Fig. 4 is a side view partially in cross section along the line 4—4 of Fig. 3;

Fig. 5 is a cross-sectional view of a part of the selector and taken along the line 5—5 of Fig. 4;

Fig. 6 is a cross-sectional view through the selector taken along the line 6—6 of Fig. 3;

Fig. 7 is a cross-sectional view of the selector along the line 7—7 of Fig. 3;

Fig. 8 is a cross-sectional view of the selector along the line 8—8 of Fig. 3;

Fig. 9 is a cross-sectional view on a slightly enlarged scale as taken along the line 9—9 of Fig. 3;

Fig. 10 is a perspective view of the nut element and washer separator of the selector;

Fig. 11 is a cross-sectional view of a nut element and washer assembly as taken along the line 11—11 of Fig. 3; and Fig. 12 is a cross-sectional view of the selector along the line 12—12 of Fig. 3.

In Figs. 1 and 2 there is shown an apparatus for producing unit assemblies of lock washers and nut elements. In speaking of assemblies or unit assemblies I mean nut elements and washers that have been brought into telescopic association and which may or may not be permanently secured together.

In the machine shown in Figs. 1 and 2 there is an assembly mechanism 18 including a cup-like housing or casing 20 conveniently formed of cast metal. A drive shaft 22 is journaled in suitable bearings in a boss 24 formed on the side of the housing 20. A worm 26 on the end of the shaft 22 meshes with and drives a worm wheel 28 fixed on an upstanding shaft 30 journaled in a boss 31 in the bottom of the housing 20. A cylindrical bushing 32 also is fitted on the shaft 30 and is locked to the worm wheel 28 for rotation therewith by suitable means such as a tooth-in-slot connection 34. The bushing 32 is provided with a radially extending flange 36 at its lower end.

A pulley 38 also is mounted on the shaft 30 for rotation therewith and is fixed to the bushing 32 for rotation therewith by means such as a tooth-in-slot connection 40. A collar 42 is pinned to the top of the shaft 30 to maintain the pulley 38, the bushing 32, and the worm wheel 28 on the shaft.

A cylinder 44 having a wide peripheral flange 46 at its base fits over the bushing 32 and rests on the flange 36. The cylinder 44 is suitably keyed as at 48 to the bushing 32 for rotation therewith. A washer disc assembly 50 is mounted on the cylinder 44 for rotation therewith and includes a lower, relatively thick circular disc or plate 52 resting on the flange 46. An upper disc or plate 54 is spaced above the disc 52 a short distance by a washer 56. The disc 54 is thick in its central portion and is relieved near the periphery thereof to provide a relatively thin outer edge 58, this edge being of substantially the same thickness as a conical rim lock washer exclusive of the rim, skirt or flange of the washer. The discs 52 and 54 are provided with aligned recesses 60 which are equally spaced arcuately. A washer 62 is clamped against the top surface of the disc 54 by a nut 64 threaded on the upper end of the cylinder 44 to clamp the disc assembly 50 in place against the flange 46. Rotation of the disc assembly 50 with the cylinder 44 is insured by a pin 66 fitting through the discs 52 and 54 and through the washers 56 and 62. The disc assembly 50 is inclined with the edge most remotely disposed from the worm 26 being the highest edge and the edge closest to the worm 26 being the lowest edge. A peripheral wall 68 extends upwardly from the housing or casing 20 substantially in contact with the outer edge of the disc assembly 50. The wall 68 is cut down or terminated at 70 while the wall adjacent the bottom edge of the disc extends chordally across the top surface of the disc as at 72. An arcuate separator plate 74 extends inwardly from the outer periphery of the disc assembly 50 and from the chordal wall portion 72 substantially to a nut element supply chute 76 at the top edge of the disc. The arcuate separator plate 74 is supported by a pair of legs 78 upstanding from the casing or housing 20.

A conical lock washer 80 is shown in Fig. 11 and includes radially outwardly extending, twisted locking teeth 82 and a central rim, skirt or flange 84 of frusto-conical configuration. The thin outer edge 58 of the upper plate 54 of the disc assembly 50 is of substantially the same thickness as the lock washer 80 exclusive of the rim, skirt or flange 84. Thus, lock washers which are piled up as a random mass on the lower portion of the disc assembly 50 against the wall 68, 72, settle into the recesses 60 and ride along the top of the separator plate 74. When the washers are correctly oriented with their skirts or flanges 84 upwardly directed, the washers seat firmly in the recesses. When the washers are received in the recesses 60 with the washer flanges downwardly directed, the main portions of the washers are above the thin edge 58 of the plate 54 and the washers tend to fall out of the recesses to slide back down the disc assembly into the random mass of washers. Any washers positioned with their flanges downwardly directed and which are not displaced from the recesses by gravity and vibration of the machine are deflected from the recesses 60 by the tip 86 of a spring finger 88 mounted on the inner face of the wall 68 by means of screws 90. The screws preferably fit through vertical slots in the wall 68 for adjustment of the finger 88 toward and away from the disc assembly 50 and are threaded into a retaining member 92. The lower edge of the finger tip 86 is formed complementary in shape to the washer flanges to pass washers with their flanges upwardly directed and to engage and deflect washers with their flanges downwardly directed.

Just after passing the finger tip 86, the upright washers pass beyond the end of the separator plate 74 and drop to the bottoms of the recesses 60 in the relatively thick bottom plate 52 to ride on a supporting plate 94 for assembly with nut elements will be apparent hereinafter.

Twisted tooth lock washers, particularly such lock washers having axially directed rims, skirts or flanges such as are handled by the machine herein disclosed, tend to clump together. An agitator 96 is provided to defeat this tendency. The agitator includes a bracket 98 upstanding along the wall 68 and secured to the housing or casing 20 by means such as screws 100. A pair of arms 102 extends inwardly over the disc assembly 50 and carries a bearing support 104 inclined slightly from the perpendicular relative to the disc assembly 50. A shaft 106 is journaled in a bearing sleeve 108 in the bearing support 104 and is provided with a reduced diameter lower end threaded into a wheel 110. The lower face of the wheel is relieved near the periphery thereof to provide a substantially conical surface 112. A finger 114 extends downwardly from the conical surface 112 and substantially perpendicular thereto, reaching nearly to the disc assembly 50 when near the outer edge thereof. A pulley 116 is fixed on the upper end of the shaft 106 for rotating the same. A flexible bolt 118 extends between the pulleys 38 and 116 for driving the latter.

The nut element supply chute or track 76 is of conventional channel-shaped construction having a pair of spaced apart side rails or flanges 120 and a floor or web 122 extending therebetween. Nut elements 124 are fed down this chute and are of the axially flanged or skirted type shown in cross-section in Fig. 11. Each nut element 124 is provided with a substantially central, axially extending skirt or flange 126 surrounded by an annular recess 128. The recess 128 is adapted to receive the washer flange 84 following which the nut skirt 126 is outwardly swaged beneath the washer flange permanently to trap the washer on the nut element as will be apparent hereinafter. The nut elements 124 are supplied from any suitable hopper and selector mechanism to the chute 76 with the nut element skirts 126 downwardly directed. A retaining strip 130 is secured on top of one of the rails or flanges 120 and partially overlies the nut elements 124 positively to retain them in the chute 76.

The chute 76 and disc assembly 50 have the same inclination and the chute terminates in close contiguity to the upper edge of the disc assembly. Nut elements 124 slide from the chute 76 into the recesses 60 on top of the washers 84. The nut elements may feed directly into each recess 60 at it comes into alignment with the nut elements in the chute 76, or preferably may be restrained so as to be fed only into recesses in which washers are present. A control lever 132 is pivoted on the chute 76 at 133 and is urged away from the chute by a spring 134. An arm or finger 136 on the lever 132 is adapted to engage and retain nut elements in the chute 76 when the lever 132 is urged toward the chute.

A slide member (not shown) is mounted in the chute 76 and is spring urged longitudinally thereof into engagement with washers 80 in the recesses 60. When no washer is present in a recess, the slide member slides forwardly part way into the recess. A control arm 138 (Fig. 1) extends transversely from the slide member and carries a rounded cam follower 140 contacting a wedge-shaped cam 142 on the side of the lever 132. When the slide member encounters a washer in a recess 60, the slide member cannot enter the recess and is held back against its spring so that the cam follower 140 engages the thin part of the cam 142, thus allowing the spring 134 to push the lever 132 outwardly to retract the arm 136 so that a nut element may slide gravitationally from the chute into a recess. When no washer is present in a recess, the slide member slides part way into the recess and shifts the cam follower 140 toward the thick end of the cam 142. This forces the lever 132 inwardly toward the chute 76 and shifts the arm 136 inwardly to engage and retain the foremost nut element 124.

Nut elements that drop on top of washers are constantly shaken slightly by the vibration of the machine and generally become settled on the washers as shown in Fig. 11. Occasionally, in spite of the high degree of perfection of the assembly mechanism, a nut element or washer may end up alone in one of the recesses, or a nut element may not settle properly on top of a washer, but may be canted. Improper settling also may be due to a defective nut element or washer or to an inverted nut element or washer. My assembly selector 144 has been provided to separate such defective assemblies.

The assembly selector 144 includes a base plate or block 146 secured to the housing or casing by an angle bracket 148 (Fig. 2). The upper edge 148 (Fig. 1) of the base plate 146 abuts the trailing edge 70 of the supporting plate 94. The top surface of the base plate 146 is parallel to that of the arcuate supporting plate 94 but is displaced therefrom a short distance so that the nut element and washer assemblies 150 drop from the plate 94 to the base plate 146 a distance substantially equal to the thickness of a washer. A guide strip 152 is secured along an edge of the plate 146 and underlies the disc assembly 50. The upper end of the strip 152 is relieved at 154 to insure smooth engagement of assemblies with the edge of the strip 152. A thicker strip 156 (Figs. 1 and 3) is secured by means such as screws 158 to the top of the strip 152 outside the periphery of the disc assembly 50, and is provided with an arcuate edge 160 to afford the closest possible spacing. The lower edge of the strip 156 is cut away diagonally at 162 for reasons shortly to be apparent.

A second guide strip or rail 164 (Figs. 1–3) is secured to the base plate 146 by means such as screws 166. The rail 164 is substantially tangent to the disc assembly 50 and is parallel to the strip 152, being spaced therefrom a distance just slightly greater than the diameter of one of the washers 80. The strip 152 and rail 164 form a guide channel for directing the assemblies 150 from the recesses 60 of the disc assembly 50.

A spirally knurled roller 168 (Figs. 1 and 3–8) is journaled in a bearing 170 set in an upstanding part 172 (Figs. 3 and 4) of the overlying strip 156. The other end of the roller 168 is journaled in a slide block 174 (Figs. 3, 4, and 5). The slide block 174 fits in a rectangular opening 176 along one side of a bracket 178 carried by the plate 146. The bracket 178 is provided with an arm 180 underlying the base plate 146 and secured thereto by suitable means such as screws 182.

A coil spring 184 is compressed beneath the slide block 174 and the slide block is pressed down against this spring by a bolt 186 threaded into the top of the bracket 178. A jam nut 188 is threaded on the top of the bolt 186 for fixing the bolt in adjusted position. A plate 190 (Figs. 1 and 3) is secured on the side of the bracket 178 by suitable means such as screws 192 to hold the slide block 174 and spring 184 in position laterally of the roller 168 while another plate 194 (Figs. 1, 3, and 4) is secured on the bracket 178 by suitable means such as screws 196 to prevent endwise movement of the block 174. The block is prevented from moving in the other direction longitudinally of the roller 168 by a collar 198 (Figs. 3 and 4) pinned on the roller 168 and engaging the block 174. The roller 168 has an upper end 200 of relatively large diameter joined to a lower end 202 of relatively small diameter by a tapered or frusto-conical section 204. The upper and lower ends and the frusto-conical section have a spirally knurled outer surface as shown in the drawings. The axis of the roller 168 is arranged parallel to the top surface of the base plate 146 and the roller is spaced from the base plate so that loose nuts 124 and washers 80 can pass under the large diameter part as shown in Figs. 4 and 6. The roller 168 is arranged diagonally across the bottom of the channel defined between the strips 152 and 164 so that all nut elements, washers and assemblies sliding downwardly through the channel must be engaged at the upper end 200 of the roller 168.

The spiral knurls on the roller 168 have substantially radially extending leading edges 201 (Fig. 9) tapering at 203 to succeeding knurls. Assemblies 150 are too high to pass under the large diameter end 200 of the roller and engage a knurl as shown in Fig. 9. The inclination of the plate 146 is such as to tend to slide assemblies 150 along the roller, and in addition to this, the constant rotation of the roller causes the spiral knurl engaged by each assembly to feed the assembly positively down the plate 146 to the smaller diameter end 202 beneath which they pass as shown in Figs. 4 and 7. Defective assemblies such as those in which the nut element 124 is canted on top of the washer 80 as shown in Fig. 8 are too high to pass under the lower end and accordingly are fed further along the roller 168 to fall off the edge of the plate 146.

To prevent nuts and nut elements from jamming between the roller 168 and base plate 146, the roller is constantly rotated in a clockwise direction as shown in Figs. 6-8, namely, from the outer end of the roller. In order to effect such rotation, a helical gear 206 is keyed on a reduced end portion of the roller 168 between the knurled portion and the aforementioned collar 198.

A shaft 208 (Figs. 1 and 3-5) is journaled in a bearing 210 (Figs. 4 and 5) in the underlying part 180 of the bracket 178 and in a bearing 212 in an overlying part 214 of the bracket. A helical gear 215 may be keyed on the shaft 208 and meshes with the helical gear 206 for driving the latter. The gear 216 is fixed in position on the shaft 208 by a set screw 218 threaded into a hub or sleeve 220 on the gear. A "kicker" wheel 222 is keyed or otherwise suitably fixed to the shaft 208 directly beneath the helical gear 216 from which it is spaced by a hub or boss on the wheel. The "kicker" wheel 222 is provided with peripheral serrations or teeth to prevent jamming of assemblies as will be apparent shortly.

Rotation of the shaft 208 is effected by a belt 224 engaging a pulley 226 (Fig. 4) on the bottom end of the shaft 208 and a pulley 228 (Fig. 2) on the bottom end of the shaft 30 extending beneath the housing or casing 20.

Loose nut elements 124 and washers 80 passing beneath the large diameter end 200 of the roller 168 are segregated by a separator strip 230 (Figs. 1, 3, 10, and 12) disposed diagonally across the base plate 146 and parallel to the diagonal lower end 162 of the strips 156 and 152. The separator strip 230 is provided with a depending wall 232 arranged diagonally of the separator strip 230. A shoulder 234 formed on the depending wall 232 at its junction with the strip 230 acts in conjunction with a screw 236 to fix the strip in position spaced above the surface of the plate 146 a distance sufficient to allow washers 80 to pass thereunder as shown in Figs. 3 and 12. The washers thus continue down the inclined base plate 146 to fall off the lower edge thereof at 238. The nut elements 124 are too thick to pass beneath the strip 230 and are deflected sideways thereby to drop from the side of the plate 146 at 240. Suitable receptacles are provided to catch the nut elements 240 and washers 80 as they drop from the plate 146.

A guide rail 242 is arranged parallel to the channel between the strips 152 and 164 and is positioned adjacent the frusto-conical section 204 of the roller 168. The upper end of the guide rail 242 abuts the free end of the separator strip 230 and is relieved at 244 on the side opposite the separator strip. The rail 242 is spaced from the "kicker" wheel 222 a distance just slightly greater than the diameter of a washer. Therefore, each perfect assembly passing beneath the small end 202 of frusto-conical section 204 of the roller 168 must engage the rail 242 and be in substantial contact therewith to pass the "kicker" wheel. The curved upper end 244 of the rail 242 and the curvature of the "kicker" wheel facilitates proper centering of the assemblies, and jamming is prevented by the continuous rotation of the "kicker" wheel. The rail 242 is of slightly greater height than the height of a perfect assembly and a cover plate 246 is secured to the top of this rail and overlies the space between the rail, the "kicker" wheel, and the roller 168 to insure the assemblies' remaining substantially flat on the plate 146. A guide plate 248 having a beveled upper edge is arranged parallel to the strip 242 and immediately adjacent the "kicker" wheel 222 to maintain assemblies passing the "kicker" wheel properly positioned.

An assembly feeding chute 252 substantially identical with the nut element feeding chute 76 is secured to the plate 146 at the lower edge thereof and is aligned with the space between the rail 242 and plate 248 so that perfect assemblies 150 will pass gravitationally down the chute to a suitable staking mechanism 254 shown generally in Fig. 1. The staking mechanism 254 comprises suitable supporting means 256 carrying a transversely reciprocable slide 258 having an assembly receiving opening aligned with the lower end of the chute 252 for receiving assemblies therefrom. The staking unit 254 further includes an anvil in the form of a bolt 260 threaded into the top of the supporting means 256 and locked in position by a jam nut 262. A staking pin having a frusto-conical tip is reciprocated axially of the assemblies by a cam wheel 263 on a cam shaft 264. The frusto-conical tip of the staking pin is adapted to engage the skirt 126 of each nut element 124 to swage or deform the skirt 126 (Fig. 11) outwardly beneath the washer flange 84 permanently to trap the washer on the nut element. In effecting such swaging the staking pin raises each assembly slightly into contact with the anvil 260.

A second cam 266 is fixed on the end of the cam shaft 264 and engages a cam follower connected through a rod 268 to the slide 258. After the cam 262 has acted to force the staking pin up to secure the nut element and washer of an assembly in permanently assembled relation, the cam 266 acts to allow a spring 270 to shift the slide 258 to the right to discharge the finished assembly. The cam 266 then shifts the slide back to the left so that nut assembly can slide gravitationally from the chute 252 into the staking mechanism 254.

Operation of the various mechanisms of the assembly machine 18 has been set forth heretofore in considerable detail as each mechanism has been explained. Therefore, the over-all operation can be summarized.

Loose washers 80 dumped in a random mass on top of the disc assembly 50 are picked up in the recesses 60 of the disc assembly and are slid along on top of the plate 74 past the finger tip 86 which allows only washers properly seated in the recesses with their flanges upwardly directed to pass. The washers then drop from the plate 74 to the bottoms of the recesses where they rest on the plate 94 and receive nut elements from the chute 76. The nut elements may pass into each recess, but preferably are controlled to pass only into recesses containing washers as has been set forth earlier. The recesses are just large enough to contain washers and nut elements, and this, coupled with the inherent vibration of the machine, causes the nut elements to settle on the washers in properly telescoped relation.

The assemblies, and also any loose washers or nut elements in the recesses, pass from the disc assembly 50 to the selector 144. The stepped roller 168 having the different diameters allows loose nut elements and washers to continue in a substantially straight path beneath the large diameter end of the roller. The separator strip 230 deflects nut elements but passes washers beneath it and thereby segregates the nut elements and washers into separate masses. Perfect and defective assemblies are both fed along the knurls of the stepped roller 168 to the small diameter end 202, or at least to a part of the frusto-conical section 204, beneath which the perfect assemblies pass. Defective assemblies which are too high by virtue of their being canted or for any other reason do not pass under the roller 268, but are fed along the knurls of the small diameter end of the roller and drop from the side of the separating mechanism to a suitable container.

The perfect assemblies are properly positioned by the "kicker" wheel 222 and pass down the chute 252 to the staking mechanism 254 wherein the nut element skirts are swaged permanently to trap the lock washers on the nut elements. The swaged nut elements and lock washers then are discharged into a suitable receptacle from the side of the machine.

Although a specific example of my invention has been shown and described, it will be apparent that the description given is merely illustrative. The illustrative example is not to be construed a limitation on the invention, as the invention includes all that which falls fairly within the spirit and scope of the appended claims.

I claim:

1. Mechanism for separating perfect assemblies of nut elements and washers from improperly assembled and loose nut elements and washers comprising supporting means adapted to transport nut element and washer assemblies and loose nut elements and washers, stepped means arranged obliquely of the path of transport and having sections spaced different distances from said supporting means to separate assemblies from loose nut elements and washers, and deflecting means positioned beyond the part of said stepped means spaced most closely to said supporting means farther along the path of transport and spaced a predetermined distance different from the spaced distances of said stepped means from said supporting means for passing loose washers and being disposed obliquely of said path of transport for deflecting loose nut elements to separate the loose washers and the loose nut elements.

2. Mechanism for separating perfect assemblies of nut elements and washers from improperly assembled and loose nut elements and washers comprising an inclined plate adapted slidingly to transport nut element and washer assemblies and loose nut elements and washers, stepped means arranged obliquely of the sliding path along said plate and having sections spaced different distances from said plate for separating assemblies from loose nut elements and washers, and deflecting means positioned beyond the part of said stepped means spaced most closely to said supporting means and arranged obliquely of the sliding path in the opposite direction from said stepped means and spaced a predetermined distance from said plate for passing loose washers and for deflecting loose nut elements for separating loose nut elements from loose washers.

3. Mechanism for separating perfect assemblies of nut elements and washers from improperly assembled and loose nut elements and washers, comprising a slide plate adapted slidingly to transport nut element and washer assemblies and loose nut elements and washers, roller means arranged obliquely across the path of transport, said roller means having a plurality of different diameters leaving a plurality of different clearance spaces between said roller means and said slide plate for separating perfect assemblies of nut elements and washers from improperly assembled and loose nut elements and washers according to differences in height, and means for rotating said roller means with the portion of said roller means nearest said slide plate moving substantially against the path of transport to prevent jams.

4. Mechanism for separating perfect assemblies of nut elements and washers from improperly assembled and loose nut elements and washers comprising supporting means adapted to transport nut element and washer assemblies and loose nut elements and washers, a stepped roller spaced above said supporting means and arranged obliquely of the path of transport, said stepped roller being unitary and having a plurality of different diameters providing clearance spaces above said supporting means for separating assemblies and loose nut elements and washers according to differences in height, and means for continuously rotating said roller with the side of said roller closest to said supporting means moving substantially in opposition to said path of transport to prevent jams.

5. Mechanism for separating perfect assemblies of nut elements and washers from improperly assembled and loose nut elements and washers, comprising supporting means adapted to transport nut element and washer assemblies and loose nut elements and washers, a stepped roller arranged obliquely of the path of transport and having a spirally knurled outer surface spaced from said supporting means, said roller having a plurality of different diameters providing different clearance spaces adjacent said supporting means for separating assemblies and loose nut elements and washers according to differences in height, and means for rotating said roller with the side of said roller adjacent said supporting means moving substantially in opposition to said path of transport for preventing jams.

6. Mechanism for separating perfect assemblies of nut elements and washers from improperly assembled and loose nut elements and washers, comprising an inclined plate adapted slidingly to transport nut element and washer assemblies and loose nut elements and washers, and a stepped roller arranged obliquely across the path of transport, said stepped roller having a spirally knurled outer surface having sections spaced different distances from said plate for providing different clearance spaces to separate assemblies from loose nut elements and washers according to differences in height, means for rotating said roller with the part thereof nearest said plate moving substantially in opposition to said path of transport to prevent jams, and a deflector arranged obliquely of said path of transport substantially oppositely to said roller and beyond the section of said roller spaced most closely to said plate for separating loose nut elements and washers passed by said roller, said deflector being spaced above said plate a sufficient distance to provide clearance for loose washers while engaging and deflecting loose nut elements.

7. Apparatus for producing telescopically assembled nut elements and washers comprising means for telescoping nut elements and washers, means for feeding telescoped and loose nut elements and washers from said telescoping means, stepped means arranged diagonally across said feeding means and having sections spaced different distances from said feeding means for separating telescoped and loose nut elements and washers according to differences in height with the stepped portion of minimum distance from the feeding means passing loose nut elements and washers and disposed in advance of the stepped portion passing telescoped nut elements and washers, means for deforming the nut elements of each telescoped nut element and washer to retain the nut elements and washers in permanently telescoped relation, means for feeding telescoped nut elements and washers passed by said stepped means to said deforming means, and means in advance of the stepped portion passing telescoped nut elements and washers to prevent loose nut elements and washers from intermingling with the telescoped nut elements and washers being fed to the deforming means.

8. Apparatus for producing telescopic assemblies of nut elements and washers comprising means for telescoping nut elements and washers, means for feeding telescoped and loose nut elements and washers from said assembly means, a stepped roller positioned diagonally across said feeding means and having portions of different diameter spaced different distances from said feeding means for separating telescoped nut elements and washers from loose nut elements and washers according to differences in height with the stepped portion of maximum diameter passing loose nut elements and washers and disposed in advance of the stepped portion of lesser diameter passing telescoped nut elements and washers, means for rotating said roller to facilitate such separation, means for deforming the nut element of each telescoped nut element and washer to secure the nut elements and washers in permanently assembled relation, means for passing telescoped nut elements and washers passed by said roller to said deforming means, and means in advance of the stepped portion of lesser diameter passing telescoped nut elements and washers to prevent loose nut elements and washers from intermingling with the telescoped nut elements and washers being fed to the deforming means.

9. Mechanism for separating perfect assemblies of nut elements and washers from improperly assembled and loose nut elements and washers, comprising an inclined plate adapted slidingly to feed assembled and loose washers and nut elements, a stepped roller arranged obliquely across said plate and having portions of different diameter providing clearance spaces above said plate for separating assemblies from loose elements and washers according to differences in height, means for rotating said roller to prevent jams, and a deflector arranged obliquely of said plate and beyond the portion of said roller providing the largest clearance space, said deflector being spaced above said plate a predetermined distance to pass loose washers passing said roller and to deflect loose nut elements passing said roller.

10. Mechanism for separating perfect assemblies of nut elements and washers from improperly assembled and loose nut elements and washers, comprising an inclined slide plate adapted gravitationally to slide nut element and washer assemblies and loose nut elements and washers, and stepped roller means arranged obliquely across the sliding path and having a plurality of portions of different diameters providing a plurality of different clearance spaces between said roller means and said inclined slide plate, the portions of said roller means being positioned progressively down-hill with the smallest clearance space aligned with the sliding path whereby certain of said assemblies and loose nut elements and washers will pass beneath said roller means through the smallest clearance space, and others will move under the influence of gravity along said roller means to pass beneath said roller means through a larger clearance space.

11. Separating mechanism as set forth in claim 10 wherein the roller means is provided with means presenting a spiral surface configuration, and further including means for rotating said roller means with the portions of said roller means adjacent said slide plate moving in opposition to gravity and correlated with said spiral surface configuration positively to feed said article in addition to the gravity feed thereof.

12. Mechanism as set forth in claim 11 and further including a deflector positioned obliquely of said sliding path and positioned down-hill beyond the portion of said roller means providing the smallest clearance space, said deflector being spaced from said plate a lesser distance than the portion of said roller means providing the smallest clearance space and having the end thereof farthest along the sliding path positioned at a lower elevation than the other end gravitationally to separate loose nut elements and washers passed through the smallest clearance space beneath said roller means.

References Cited in the file of this patent

UNITED STATES PATENTS

| 458,422 | Ish | Aug. 25, 1891 |
| 1,245,584 | Hallock | Nov. 6, 1917 |
| 1,620,687 | Reese | Mar. 15, 1927 |
| 1,811,991 | Bates | June 30, 1931 |
| 1,832,035 | Zeib | Nov. 17, 1931 |
| 1,882,130 | Fielder | Oct. 11, 1932 |
| 2,415,970 | Snook et al. | Feb. 18, 1947 |

FOREIGN PATENTS

| 575,454 | Great Britain | Feb. 19, 1946 |